July 28, 1964 D. N. CURTISS 3,142,091
APPARATUS FOR MAKING ELASTOMERIC SHEET STOCK
Filed May 28, 1962 4 Sheets-Sheet 1

INVENTOR.
DONALD N. CURTISS
BY Charles A. Blank
ATTORNEY

July 28, 1964  D. N. CURTISS  3,142,091
APPARATUS FOR MAKING ELASTOMERIC SHEET STOCK
Filed May 28, 1962  4 Sheets-Sheet 2

INVENTOR.
DONALD N. CURTISS
BY Charles A. Blank
ATTORNEY

July 28, 1964 D. N. CURTISS 3,142,091
APPARATUS FOR MAKING ELASTOMERIC SHEET STOCK
Filed May 28, 1962 4 Sheets-Sheet 3
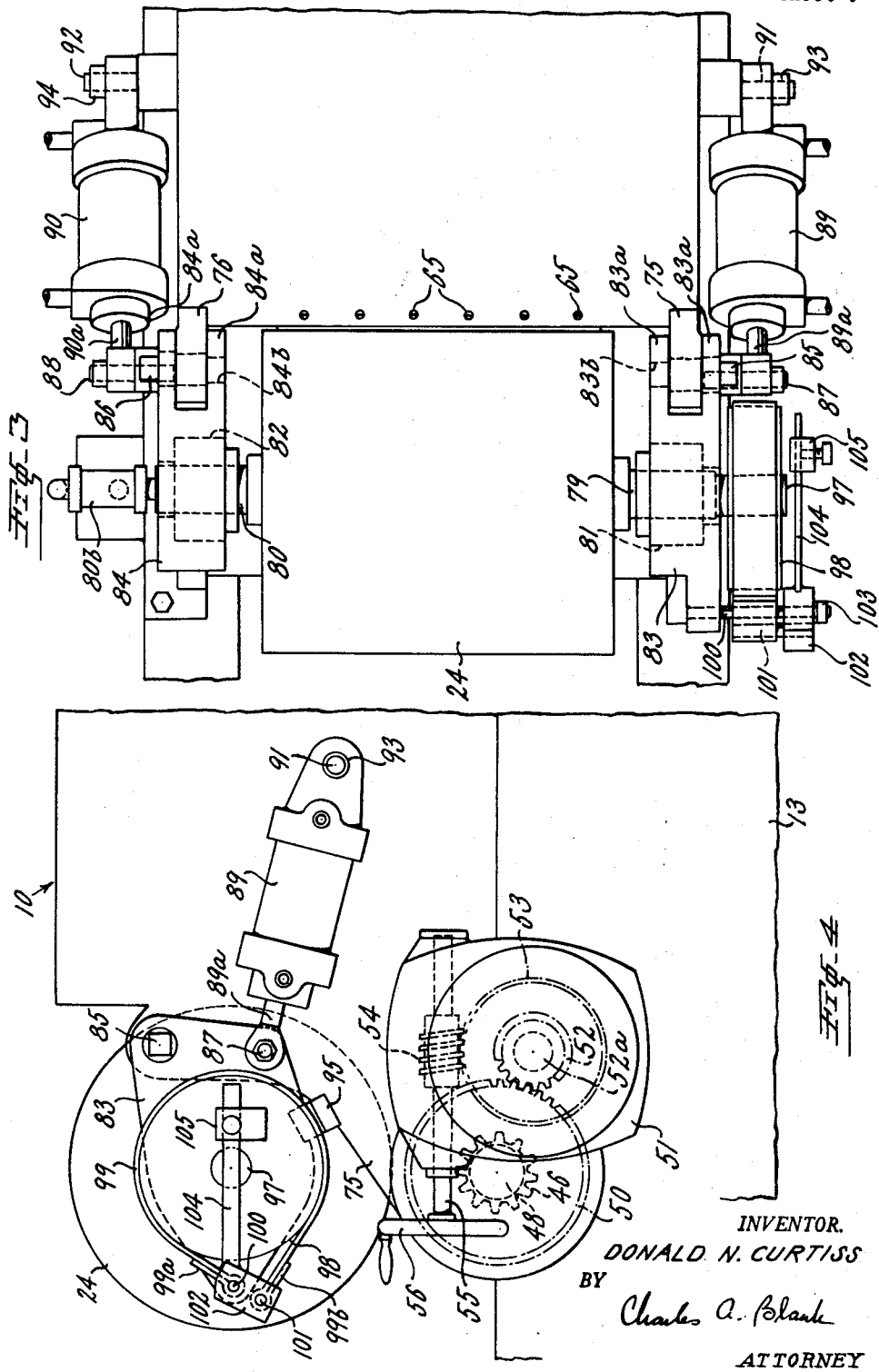
INVENTOR.
DONALD N. CURTISS
BY
Charles A. Blank
ATTORNEY

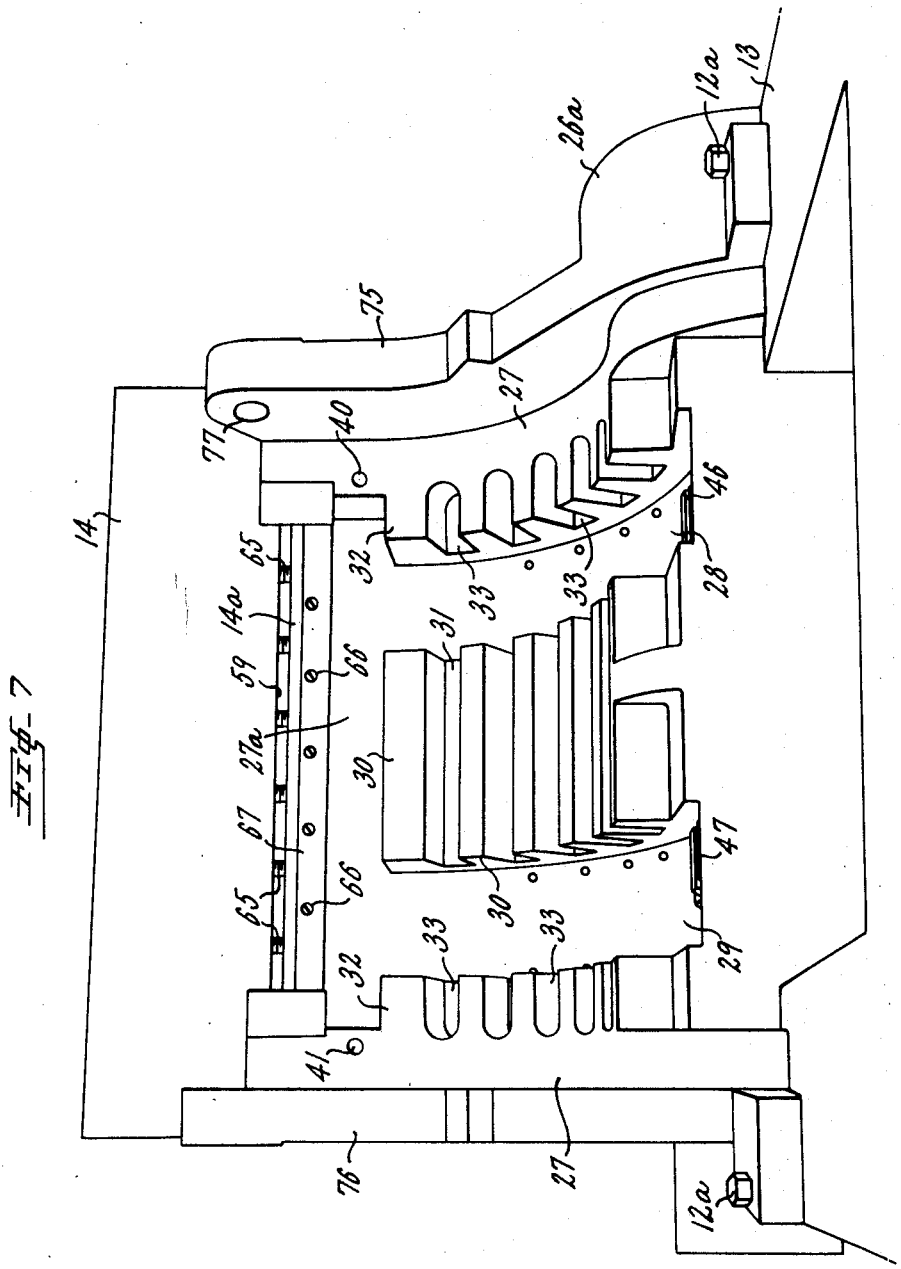

United States Patent Office 3,142,091
Patented July 28, 1964

3,142,091
APPARATUS FOR MAKING ELASTOMERIC
SHEET STOCK
Donald N. Curtiss, Franklin Lakes, N.J., assignor to
United States Rubber Company, New York, N.Y., a
corporation of New Jersey
Filed May 28, 1962, Ser. No. 198,098
9 Claims. (Cl. 18—12)

This invention relates to an apparatus for making uncured elastomeric stock, and, more particularly, to an adjusting means for changing the cross-sectional size of the extrusion orifice and the shaping cavity for a stock making apparatus.

By way of definition, the terms "elastomeric" and "elastomeric stock" as employed herein are intended to designate not only rubber, as such, but also a variety of other materials which may be extruded into any desired shape. Thus, these terms encompass both natural and synthetic rubber, as well as resins and other plastics, with or without a rubber content, which may be described as "rubbery," e.g. polyethylene, vinyl chloride, etc.

In the production of elastomeric stock, it is often desired to vary the thickness of the stock from time to time.

In machines of the general type which comprise the basic structure of a drum, an extrusion orifice, and a shaping cavity formed by the periphery of the drum and a surrounding shield or band, it is necessary, in order to vary the stock thickness, to change the cross-sectional height of the extrusion orifice and the shaping cavity.

In previous machines the height changes are accomplished by completely disassembling portions of the apparatus and making separate adjustments to the orifice and the shaping cavity. This is a time-consuming operation resulting in long shut-down periods and occasional inaccurate settings.

Accordingly, an object of this invention is to simplify adjustments of the cross-sectional height of the extrusion orifice and the shaping cavity.

A further object of the present invention is the provision of an extrusion apparatus which is adapted to the production of dimensionally stable uncured elastomeric stock of different thicknesses as aforesaid and which is capable of adjusting the sizes of the extrusion orifice and the shaping cavity in such a manner as always to maintain a predetermined ratio between the cross-sections thereof.

To accomplish the above and other objects I have provided an apparatus in which the shaping or sheet-forming cavity is defined between a rotatable drum and a concentric shield extending along a part of the periphery of the drum, with the drum being adapted to exert a snubbing or braking action on the extrudate in the cavity so as to effect a stress reorientation in the extrudate, and in which the shield is integrally connected to an element which defines a part of the extrusion orifice or die opening so as to enable a common cam system operatively engaging both said shield and said element to effect a joint adjustment of and maintain a predetermined relationship between the cross-sectional heights of said cavity and die opening.

The foregoing and other objects, characteristics and advantages of the present invention will be more clearly understood from the following detailed description thereof when read in conjunction with the accompanying drawings, in which:

FIG. 3 is a top plan view of the apparatus shown in FIGS. 1 and 2 and illustrates the mounting of the extrudate-contacting drum;

FIG. 4 is a side elevational view of the structure shown in FIG. 3;

FIG. 7 is a front elevational view, partly in perspective, of the cam track structure for the cavity and orifice-adjusting mechanism of the apparatus shown in FIG. 1.

Figure 1:
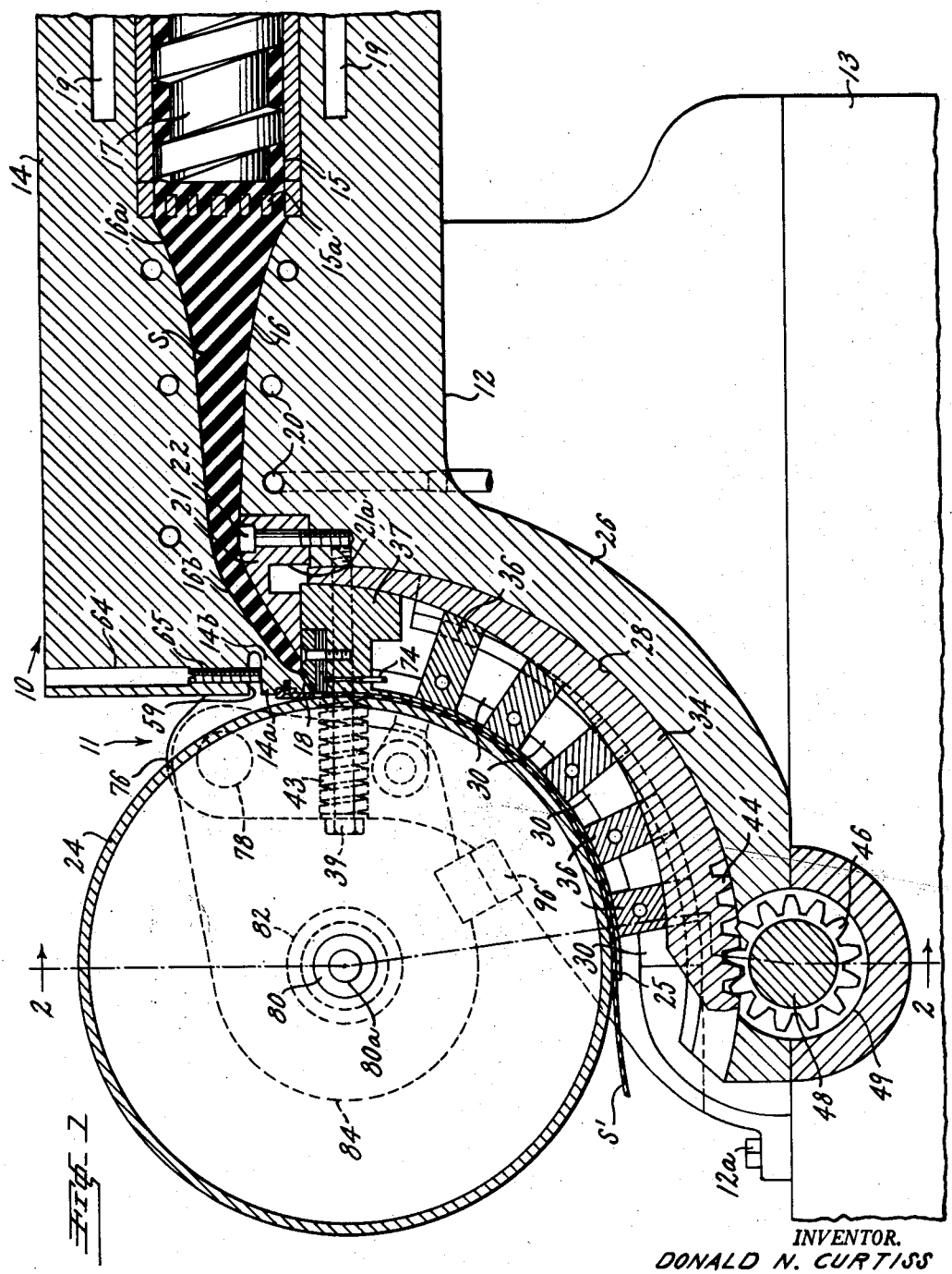
FIG. 1 is a sectional side elevational view of an extrusion apparatus embodying the principles of the present invention, the view being taken substantially along the line 1—1 in FIG. 2.

Referring now more particularly to the drawings, the sheet-extruding apparatus according to the present invention comprises essentially an extrusion head structure 10 and a sheet-forming cavity structure 11. As clearly shown in FIG. 1, the extrusion head 10 comprises a lower block or casting 12 affixed, as by means of bolts 12a, to a rigid base 13, and an upper block or casting 14 seated atop the lower block 12 and affixed to the latter in any suitable manner (not shown). The upper surface of the lower block 12 and the lower surface of the upper block 14 are provided with matched channels so as to define interiorly of the head 10 an extrusion chamber 15 and a transfer chamber 16. Arranged within the chamber 15 is a conventional rotatable extruder screw 17 adapted to force the stock S to be formed into sheets, e.g. crude natural or synthetic rubber, plastic or like material, through an orifice plate 15a into the transfer chamber.

The transfer chamber 16 is elongated transversely to the direction of movement of the material S therethrough and is further tapered from its inlet end 16a toward its discharge end 16b so that its vertical dimension or height diminishes progressively from the screw 17 to the extrusion orifice or die opening 18 (still to be described) of the extrusion head. In this manner, the stock S is flattened and spread out as required, and by virtue of the downward inclination of the frontmost section of the transfer chamber 16 adjacent the discharge end 16b of the latter, the stock is deflected downwardly toward the extrusion orifice. As clearly shown in FIG. 1, the lower surface of this section of the transfer chamber is preferably constituted by a suitably profile insert 21 which is affixed to the block 12 by bolts 22. Conventionally, also, the blocks 12 and 14 are provided, respectively, with internal ducts 19 and 20 adjacent the chambers 15 and 16, through which ducts steam or like heating fluid can be coursed for the purpose of maintaining the stock being extruded at the desired and proper elevated temperature.

The actual shaping cavity 23 of the cavity structure 11 in which the sheet S' is ultimately formed is defined between a rotatable drum 24 and a somewhat flexible curved shield 25 which extends downwardly over a part of the periphery of the drum 24 substantially from the horizontal center plane to the vertical center plane of the drum. The center of curvature of the shield 25 is located at the center of the drum 24, and the cross-sectional height of the cavity 23 is thus uniform from its inlet end adjacent the lowermost or discharge edge of the extrusion orifice 18 to its discharge end below the drum. In accordance with the present invention, means are provided for maintaining a predetermined relationship between the cross-sectional heights of the extrusion orifice 18 and the sheet-forming cavity 23, which means will be more fully described presently.

Figure 2:
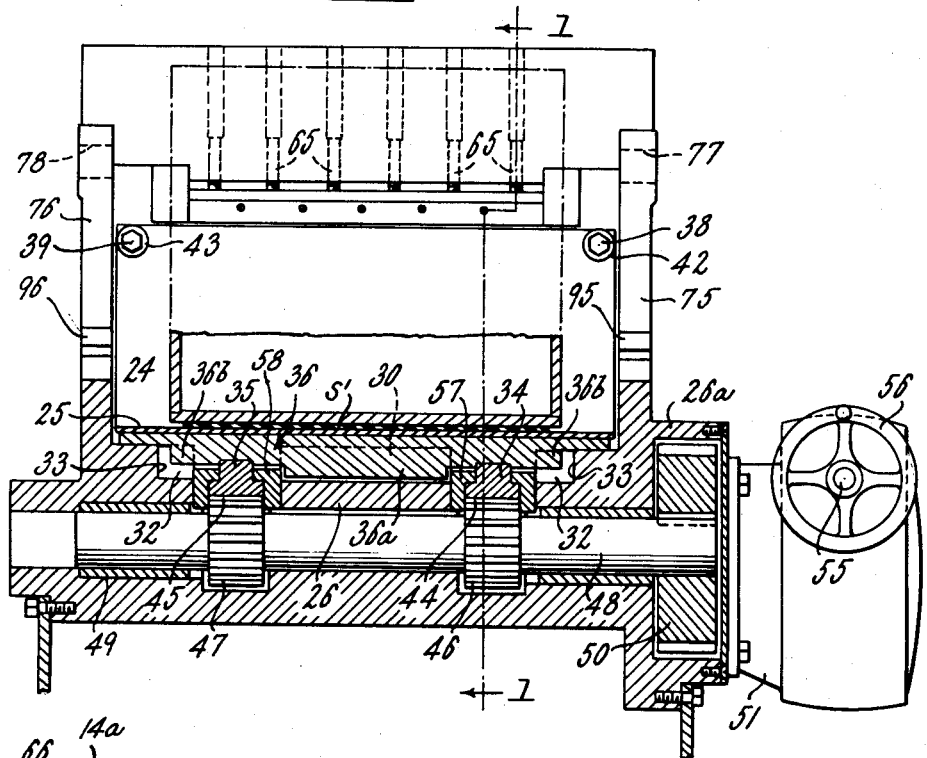
FIG. 2 is a sectional front elevational view of the said apparatus, the view being taken along the line 2—2 in FIG. 1.

Referring now in particular to FIGS. 1, 2 and 7, it will be seen that the base of the cavity structure 11 is constituted by an arcuate block 26 which in the illustrated embodiment of the invention is integral with the lower extrusion head block 12 and conveniently may be formed together therewith as one and the same casting. The uppermost surface 27 of the block 26 is curved, and its center of curvature coincides with that of the drum 24 and shield 25. The block 26 is cut away both longitudinally and transversely at its surface 27 to provide a pair of parallel tracks or guideways 28 and 29 disposed, respectively, between a central set of ridges 30 separated by grooves 31 and two lateral sets of ridges 32 separated by grooves 33. Each of the central ridges 30 is in longitudinal alignment with a respective pair of the lateral ridges 32, and likewise each of the grooves 31 is in longitudinal alignment with a respective pair of the grooves 33. Moreover, the ridges 30 and 32 are wider at their bottom edges than at their tops so as to ensure that the sidewalls of the respective grooves 31 and 33 are parallel to one another.

Slidably positioned in the tracks or guideways 28 and 29 are two parallel, heavy-duty, elongated metal bands 34 and 35. The lowermost surfaces of the bands 34 and 35 are circularly curved, and thus their centers of curvature also coincide with that of the drum 24 and shield 25. The upper surfaces of the bands 34 and 35, however, describe arcs of a spiral relative to the center of the drum and are farthest away from the outer face of the shield 25 adjacent their uppermost ends and nearest the shield adjacent their lowermost ends, as clearly shown in FIG. 1. The bands 34 and 35, therefore, have the shapes of arcuate longitudinal wedges, being thinner at their uppermost ends and thicker at their lowermost ends. As will become more clear from the following, these bands or wedges perform a camming function, and accordingly they will hereinafter be referred to as cams or cam means.

Arranged in the respective transverse grooves 31–33, i.e. between the respective adjacent ridges 30–32, for reciprocal sliding movement radially of the drum 24 are back-up bars 36. The uppermost surfaces of the bars 36 are in sliding engagement with the outer or lower face of the shield 25 and thus provide support for the latter. As clearly shown in FIG. 2, each of the bars 36 has a central section 36a which extends into the associated groove 31, and two lateral sections 36b which extend, respectively, into the grooves 33 aligned with the said groove 31. Each bar 36 is in sliding contact with the upper surfaces of the cams 34 and 35 at respective longitudinally spaced locations on opposite sides of its center section 36a. The thicknesses of the back-up bars 36 at these locations differ from one bar to the next, being smallest at the lowest bar 36 shown in FIG. 1 and greatest at the uppermost bar 36, and the lower surfaces of the bars contacting the cams are curved spirally in the same sense and manner as the upper surfaces of the cams. It will be readily understood, therefore, that upon reciprocation of the cams 34 and 35 along their respective tracks 28 and 29 by means still to be described, the back-up bars 36 are moved radially of the drum 24 and thus serve to move the shield 25 radially toward and away from the drum so as to vary the height of the cavity 23 and thus the gauge of any sheet S' formed therein accordingly.

Referring again to FIG. 1, it will be seen that the shield 25 is an integral extension of a slide block 37 (see also FIG. 5) the rear surface of which is in sliding engagement with the cams 34 and 35 adjacent the thinnest ends of the latter. The block 37 is slidably arranged in the transverse groove or space 27a above the uppermost line of ridges 30–32 and below the insert 21 affixed to the extrusion head block 12. The slide block 37 carries a pair of spaced parallel bolts 38 and 39 which extend slidably through the block and are threaded into a pair of holes 40 and 41 (see FIG. 7) formed in the block 26. Interposed between the heads of the bolts 38 and 39 and the front face of the slide block 37 are two relatively heavy compression springs 42 and 43 which continually bias and press the block 37 against the cams 34 and 35 and simultaneously ensure that the shield 25 remains in contact with the back-up bars 36.

At their lowermost ends, the bottom surfaces of the cams 34 and 35 are provided with respective rack teeth 44 and 45 which mesh with the teeth of a pair of pinions or spur gears 46 and 47 fixed to a shaft 48 rotatably journaled in and extending through a transverse bore 49 provided in the block 26 adjacent the front end thereof. Keyed to the shaft 48 at one end thereof and disposed in a well 26a at one side of the block 26 is a spur gear 50 the diameter of which is considerably larger than that of the gears 46 and 47. The gear 50 extends into a transmission housing or gear box 51 bolted to the block 26 and there meshes with a small gear 52 (see FIG. 4) fixed to a shaft 52a extending parallel to the shaft 48. The shaft 52a carries a larger gear 53 which meshes with a worm gear 54 mounted on a spindle 55 journaled in and extending out of the housing 51 and carrying at its front end a handwheel 56. Rotation of the handwheel 56 in one direction or the other, therefore, permits the cams 34 and 35 to be correspondingly displaced longitudinally along their respective tracks 28 and 29 to cause the shield 25 to approach or move away from the drum 24. The actual and maximum possible extent of such movement of the cams is, of course, very small since the differences in sheet thicknesses brought about by the shield movements are measured in thousandths of an inch. A suitable dial or indicator arrangement (not shown) may be provided in association with the hand-wheel 56 so as to permit an accurate determination of and control over the position of the shield 25 and the width of the cavity 23. As clearly shown in FIG. 1, the underside of the block 21 is recessed at 21a to accommodate the upper ends of the cams 34 and 35 at the limits of their upward or rearward movement. Also, in order to prevent any possible lifting of the cams toward the drum 24 and away from the gears 46 and 47 during rotation of the latter, there are provided in the tracks or guideways 28 and 29 two pairs of angle members or stirrups 57 and 58 (see FIG. 2) which are affixed at their opposite sides to the adjacent ridges 30 and 32 and which extend over respective pairs of lateral flanges provided at the bottoms of the cams 34 and 35.

Figure 5:
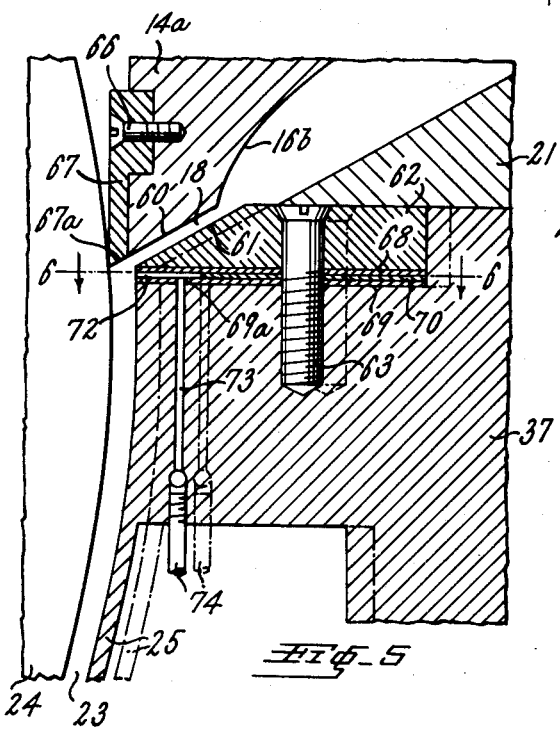
FIG. 5 is an enlarged detail view, in section, of the extrusion orifice and shaping cavity shown in FIG. 1.

Referring now to FIGS. 1 and 5 in particular, it will be seen that the upper extrusion head block 14 is provided at its front face with a transverse notch or groove 59 which extends in depth to within a short distance of that part of the block surface which defines the discharge section 16b of the transfer chamber 16. In this manner, the block 14 is provided at its lowermost front edge with a lip or projection 14a attached to the body of the block by a slightly flexible neck 14b of reduced thickness. The projection 14a is provided at its outermost edge with a downwardly slanted, flat bottom surface 60 which lies directly opposite a correspondingly slanted upper surface 61 of a plate 62 affixed by bolts or screws 63 to the top of the shield-supporting slide block 37 below the block 21 bolted to the extrusion head block 12. The surfaces 60 and 61 define between them the extrusion orifice or die opening 18. The slight flexibility of the neck 14b thus provide, by virtue of making the lip or projection 14a slightly displaceable relative to the main portion of the block 14, for an initial micrometer adjustment of the orifice 18 to ensure that the surfaces 60 and 61 are precisely parallel to one another, and thus equally spaced from one another, over the entire length of the orifice 18. For the purpose of effecting the displacements of different portions of the lip 14a required for such an adjustment, there are provided in the block 14 adjacent the front face thereof vertical bores 64 into the lowermost ends of which are threaded screws 65 the bottom ends of which project into the notch or groove 59 and bear against the upper surface of the lip 14a. Protraction or retraction of the screws 65, therefore, permits the initial position of the upper slanted surface 60 of the extrusion orifice to be accurately determined relative to the lower slanted surface 61, for example with the aid of a small micrometer or gauge block. Attached to the front face of the lip 14a by means of screws or bolts 66 is a small shield 67 of hard metal, e.g. steel, the lowermost edge face 67a of which is slanted in the same manner as and constitutes a continuation of the upper orifice-defining surface 60. The purpose of the shield 67 is to extend the upper surface of the orifice 18 substantially up to the periphery of the drum 24, and to prevent any possibility of wear or deterioration of the lowermost front edge of the surface 60 which would render the entire block 14 useless. Theoretically, of course, the front edge of the shield should touch the drum, but in practice this is not so for obvious reasons, although the clearance is very minute.

The choice of the angle which the upper die surface 60 makes with the direction of movement of the extrudate as it enters the cavity depends, in general, on the physical properties of the rubber stock S, particularly on its swelling characteristics. This angle is less than 90° and is preferably between about 70° and 30°. For most rubbery materials an angle of about 60° has been found suitable. The relationship between this angle and the percent swell of the rubber is further set forth in Table I.

Table I

| Percent swell of Rubber [1] | Approximate angle which the upper Die Plate Makes with the Direction of Movement of the Rubber |
|---|---|
| 6 | 20 |
| 16 | 30 |
| 30 | 40 |
| 41 | 45 |
| 55 | 50 |
| 100 | 60 |
| 136 | 65 |
| 192 | 70 |

[1] Percent swell=$\frac{A-B}{B}\times 100$, where A represents the cross-sectiona width of the rubber at maximum swell and B represents the cross-sectional width of the die opening.

Figure 6:
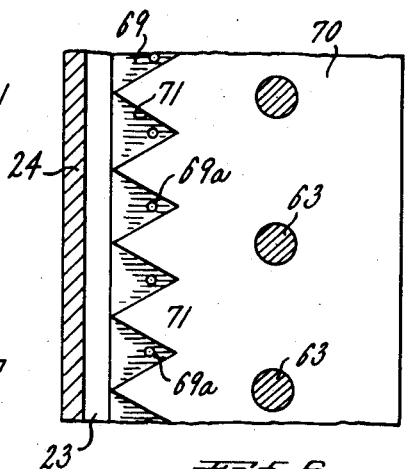
FIG. 6 is a sectional view taken along the line 6—6 in FIG. 5 and illustrates the means for lubricating the extrudate in the shaping cavity.

Means are also provided in the apparatus according to the present invention for lubricating one face of the extruded stock S as it moves into and through the sheet-forming cavity 23. Referring now to FIGS. 5 and 6, it will be seen that interposed between the bottom of the orifice-defining plate 62 and the top of the slide block 37 on which it rests are two metal plates 68 and 69 between which is sandwiched a metal shim 70 about 0.001 inch thick. The shim 70 is serrated at its front edge, as shown at 71, whereby there are established between the plates 68 and 69 at the front edges thereof a corresponding number of small angular spaces 72. The outermost tips of the serrated edge 71 of the shim 70 are flush with the front edges of the plates 68 and 69. The slide block 37 carries a plurality of ducts 73 which communicate at one end with the respective spaces 72 through small openings 69a in the plate 69, and at their other ends with suitable flexible conduits 74 connected to a source of lubricant (not shown). The lubricant thus may be pumped into the spaces 72 and when reaching the same will ooze out of them and into the cavity 23 for contact with that face of the passing stock S which engages the shield 25. The other face of the extrudate which engages the drum 24 is not lubricated.

For reasons which will presently become apparent, the drum 24 is rockably mounted on the block 26 of the cavity structure 11. To this end, the block 26 is provided with a pair of lateral parallel flanges 75 and 76 (see FIGS. 2 and 7) in the uppermost ends of which are provided two axially aligned bores 77 and 78. Extending from the opposite ends of the drum 24 are two trunnions 79 and 80 (see FIGS. 3 and 4) which are rotatably received in suitable bearings 81 and 82 carried by a pair of mounting frames 83 and 84. The trunnion 80 is hollow to provide a passageway 80a (see FIG. 1) which communicates at one end with the interior of the drum 24 and at its other end with a rotary coupling 80b to permit cooling water or like fluid to be circulated through the drum to maintain the extrudate S' at a temperature below its curing range. The frames 83 and 84 are provided, respectively, with pairs of spaced parallel ears 83a and 84a which are provided with axially aligned bores 83b and 84b. The ears 83a and 84a are positioned, respectively, at opposite sides of the flanges 75 and 76 at the upper ends of the latter, with the bores 83b and 84b in axial alignment with the respective bores 77 and 78, and the frames 83 and 84 are pivotally or rockably connected to the flanges 75 and 76 of the block 26 by means of pivots 85 and 86 extending through the aligned bores 77–83b and 78–84b.

By means of a pair of oppositely extending lateral pins 87 and 88 located below the pivots 85 and 86, the mounting frames 83 and 84 are articulated, respectively, to a pair of piston rods 89a and 90a projecting from a pair of double-acting hydraulic cylinders 89 and 90 the other ends of which are pivotally mounted on a pair of pins 91 and 92 extending from opposite sides of the lower block 12 of the extrusion head 10, the pivoted cylinder ends being retained in position on the pins 91 and 92 by collars 93 and 94. Thus, movement of the piston rods 89a and 90a outwardly of their respective cylinders 89 and 90 is effective to swing the drum-supporting or mounting frames 83 and 84 angularly upwardly about the axes of the pivots 85 and 86, so as to move the drum 24 away from the shield 25 for the purpose of facilitating inspection, cleaning and/or repair of the apparatus, e.g. for replacement of the extrusion orifice shield 67 when the same becomes worn or pitted and unfit for further use. Retraction of the piston rods into their respective cylinders to the extent shown in FIG. 4 is effective to position the frames 83 and 84 so as to dispose the drum 24 in its operative, cavity-defining relation to the shield 25, the maximum downward movement of the drum toward the shield being limited by a pair of stops 95 and 96 (see FIGS. 1, 2 and 4) provided on the flanges 75 and 76 and engageable by the bottoms of the frames 83 and 84.

As hereinbefore mentioned, the present invention contemplates attainment of dimensional stability of the sheet S' by effecting a reorientation of the extrusion-induced stresses which exist in the extrudate as the same moves through the shaping cavity 23. This stress reorientation is achieved by virtue of the fact that rotation of the drum 24 which defines one of the walls of the cavity 23 is so controlled that the drum exerts a snubbing or retarding action on the extrudate. Basically, the frictional drag or braking effect of the drum is employed to bring about this retarding action, and it is for this reason that no lubricant is applied to that face of the extrudate engaging the drum. In the illustrated embodiment of the invention, the drum 24 is freely rotatable in its mounting frames 83 and 84, i.e. its rotation is dependent on the movement of the extrudate, and the necessary interference with its free rotation is effected by a braking device.

To this end, reference being had specifically to FIGS. 3 and 4, the trunnion 79 is provided with an outer axial extension 97 which projects beyond the drum-mounting frame 83 and has fixed thereto a brake drum or pulley 98. Passing about the brake drum 98 is a friction belt or band 99 one end 99a of which passes about and is secured to a pin 100 fixed at one end to the mounting frame 83. The other end 99b of the belt 99 passes about and is secured to a pin 101 adjacent one end of the latter, the pin 101 at its other end being fixed to a block-like member 102 which is pivotally supported on the pin 100 adjacent the second end thereof and retained thereon by a nut 103. The member 102 carries a bar 104 which projects from the member rearwardly of the drum 24 and supports an adjustable weight member 105. It will, therefore, be apparent that the weight 105 biases the member 102 so as to tend to rotate about the axis of the pin 100, in a clockwise direction as seen in FIG. 4, which has the tendency to raise the pin 101 and thus to draw the belt 99 tightly against the outer surface of the brake drum 98. The degree of braking of the drum 24 depends, of course, on the adjusted position of the weight 105 on the bar 104.

Experiments have shown that the use of a braking device such as that illustrated in FIGS. 3 and 4 provides sufficient retarding forces on the extrudate if the gauge or thickness of the sheet S' is more than about 1/16 inch. However, where the gauge of the sheet S' is less than the aforesaid value, it is found advisable to employ a positive drive for the drum 24. No specific mechanism of this type is specifically illustrated herein, but it will be clear that such a drive may be effected, for example, with the aid of any suitable variable torque motor or transmission operatively and drivingly connected with one or both of the trunnions 79 and 80. In this manner, the retarding effect of the drum on the extrudate moving through the cavity 23 can, of course, be greatly decreased and more accurately controlled by corresponding driving speed variations than where the movement of the extrudate itself is the agency for setting the drum into rotation. It is of course understandable that this type of procedure is necessary with respect to very thin extrudates not having sufficient pressure to overcome the rotational friction of the braked drum. The applied torque reduces the force that the stock has to exert to cause the drum to rotate.

Inasmuch as in accordance with the present invention the shaping cavity 23 has a greater cross-sectional height than the die opening 18, the stock which is extruded through the latter would ordinarily be free to expand transversely upon entering the cavity. The longitudinal retarding force or frictional drag exerted by the drum 24, however, has the effect of positively tending to cause a shortening of the sheet S' in its longitudinal dimension, which develops a pressure within the stock S' which in turn is directed outwardly of the stock and positively urges the same to expand widthwise, transversely to the direction of advance of the stock through the cavity 23. The stock is, therefore, reoriented, i.e. the unbalanced forces in its interior which, if left undisturbed, would seek to reach a state of equilibrium by a gradual dimensional adjustment, are positively brought into balance within the cavity 23 and substantially eliminate the possibility of any further dimensional adjustment after the sheet S' leaves the cavity.

In accordance with the present invention, further, the construction of the extrusion apparatus is such that a constant relationship or ratio is established and maintained between the height of the die opening 18 (the normal distance between the surfaces 60 and 61) and the height of the cavity 23 (the normal distance between the drum and shield). This result is achieved as follows. Referring specifically to FIG. 5, it will be seen that the lowermost edge of the lower orifice surface 61 is in the same horizontal plane as the lowermost edge of the extension 67a of the upper orifice surface 60. From elementary trigonometric considerations it will be apparent that the angle between the slanted surface 60–67a and the vertical remains constant regardless of the height of the die opening or of the cavity, i.e. regardless of whether the slide block 37 and shield 25 are disposed in their solid-line position, for the production of relatively small gauge sheeting, or in their broken-line position, for the production of relatively larger gauge sheeting, illustrated in FIG. 5. The secant of this angle is equal to the ratio of the normal distance between the lower most edges of the surfaces 61 and 67a to the normal distance between the surfaces 60 and 61 (hypotenuse or over opposite), the former distance being equal to the normal distance between the drum 24 and the shield 25 over the entire expanse thereof and thus to the cross-sectional height of the cavity 23. Consequently, since the aforesaid angle remains constant, the ratio between the said normal distance, i.e. the ratio between the cross-sectional heights of the die opening 18 and cavity 23, also remains constant regardless of how large the individual values of these dimensions are. The desired adjustments of these dimensions are, of course, attained by proper displacement of the cams 34 and 35 along the tracks 28 and 29 on the block 26.

It is believed that the manner of operation of the herein described apparatus and thus also the extrusion process according to the present invention are sufficiently clear from the foregoing description as to require no detailed repetition at this point. Sheets of uncured rubber stock formed in accordance with the principles and teachings of the present invention have been found to be dimensionally stable and highly resistant to warping or other types of distortion prior to curing.

While I have described preferred embodiments of the extrusion process and apparatus according to my invention, it is to be understood that the latter is susceptible to a number of changes and modifications in the disclosed procedural steps and structural features, none of which changes and modifications involves any departure from the spirit and scope of the invention as defined in the appended claims.

Having thus described my invention, what I claim and desire to protect by Letters Patent is:

1. Apparatus for producing dimensionally stable sheeting of uncured elastomeric stock, comprising an extrusion head having a movable portion defining a die opening of adjustable cross-sectional height, a drum journaled for rotation about its axis and mounted with its outer peripheral face adjacent to said die opening, a curved shield positioned adjacent and spaced uniformly from said drum and extending over a portion of the periphery of the latter, said drum and shield defining therebetween a shaping cavity of uniform cross-sectional height greater than the cross-sectional width of said die opening, the inlet end of said cavity being in communication with said die opening, extruder means for forcing said stock through said die opening into said shaping cavity, said die opening being oriented at an angle between about 30° and about 70° to the direction of movement of the extrudate as it enters said shaping cavity, means for jointly adjusting the position of said shield relative to said drum and the position of said movable portion of said extrusion head defining said die opening, thereby to adjust said cross-sectional heights of said die opening and said shaping cavity so as to maintain a constant relationship therebetween, and braking means operatively connected with said drum for controlling the rotation thereof so as to ensure that said drum exerts a retarding force on the extrudate moving through said shaping cavity and thereby effects a re-orientation of the extrudate to eliminate residual internal stresses therefrom.

2. Apparatus for producing dimensionally stable sheeting of uncured rubber stock, comprising an extrusion head provided with an extrusion passageway and a die opening a cylindrical drum journaled for rotation about its axis and mounted with its outer peripheral face adjacent to said die opening, a circularly curved shield positioned adjacent and spaced uniformly from said drum and extending over a portion of the periphery of the latter, said drum and shield defining therebetween a shaping cavity of uniform cross-sectional height, a movable die plate carried by said extrusion head and defining with a stationary part of the latter a die opening establishing communication between said passageway and said cavity, extruder means for forcing said stock from said passageway through said die opening into said shaping cavity, means operatively connected with said die plate and said shield for jointly displacing the same to effect corresponding joint adjustments of the respective cross-sectional heights of said die opening and said shaping cavity so as to maintain a constant relationship between said height, and braking means operatively connected with said drum for controlling the rotation thereof so as to ensure that said drum exerts a retarding force on said extrudate and thereby effects a reorientation of the latter to eliminate residual internal extrusion-induced stresses therefrom.

3. Apparatus according to claim 2, said die opening being defined by a pair of opposed flat surfaces provided, respectively, on said stationary part of said extrusion head and on said die plate, at least that one of said flat surfaces on said die plate being oriented at an angle between about 30° and about 70° to the direction of movement of the extrudate as it enters said shaping cavity.

4. Apparatus according to claim 2, said first means comprising a slide block supporting said die plate and said shield, a plurality of back-up bars slidably engaging that face of said shield directed away from said drum and adapted for movement radially of the latter, cam means slidably engaging said slide block and said back-up bars for displacing the same, and gear means connected with said cam means for operating the latter.

5. Apparatus according to claim 4, further comprising a support block integral with said extrusion head and having a curved upper surface in which are provided a pair of parallel tracks extending peripherally of said drum and having centers of curvature which are located on said drum axis, said support block being further provided in said upper surface thereof with a plurality of grooves extending perpendicularly to said tracks and having their depth dimensions oriented radially of said drum, said back-up bars and said slide block being received in said grooves, respectively, and said cam means comprising a pair of longitudinally wedge-shaped cams arranged in said tracks, respectively, and having their lower surfaces which ride on said support block circularly curved concentrically with said drum, and their upper surfaces which engage said back-up bars and said slide block curved spirally relative to said drum axis.

6. Apparatus according to claim 5, further comprising a pair of mounting frames positioned at opposite ends of said drum and rotatably supporting the same, cooperable means on said support block and said mounting frames for pivotally connecting the latter to the former, and a pair of hydraulic piston and cylinder combinations each articulated at one end to said extrusion head and at the other end to a respective one of said mounting frames, whereby the latter and thus said drum may be rocked out of their operative position to permit cleaning, repair and other servicing of the apparatus.

7. Apparatus according to claim 6, further comprising a plurality of lubricant ducts extending through said slide block and communicating with said shaping cavity at the shield side thereof, and means connected with said ducts for feeding lubricant therethrough, whereby only the face of the extrudate directed away from said drum is lubricated.

8. In an extrusion apparatus for making a sheet of uncured elastomeric stock, comprising (1) a rotatable drum, (2) an extrusion die adjacent said drum and having a transversely elongated orifice of adjustable clearance between the upper and lower edges thereof and having a movable portion for adjusting the clearance, (3) a cylindrically curved shield forming, with a portion of the curved drum surface, a shaping cavity of uniform radial dimension, (4) means for forcing uncured elastomeric material through said die, and (5) snubbing means operatively connected with said drum in such manner as to oppose rotation thereof by the propulsive force of the extrudate entering said shaping cavity, the improvement which comprises an integral connection between the shield and said orifice-adjusting portion of said extrusion die and means for adjusting the position of said shield and said orifice-adjusting portion of said extrusion die circumferentially with respect to said drum and for adjusting said shield radially with respect to said drum integrally with said orifice-adjusting portion.

9. Apparatus in accordance with claim 8 in which said means for adjusting the position of said shield and said orifice-adjusting portion maintains a uniform cross-sectional height between said shield and said drum.

References Cited in the file of this patent

UNITED STATES PATENTS

| 2,330,282 | Hazeltine et al. | Sept. 28, 1943 |
| 2,365,482 | Manken et al. | Dec. 19, 1944 |
| 2,842,212 | Rhodes | July 8, 1958 |
| 2,842,796 | Rhodes | July 15, 1958 |

FOREIGN PATENTS

| 1,251,365 | France | Dec. 12, 1960 |